US006866392B2

(12) United States Patent
Hayashi

(10) Patent No.: US 6,866,392 B2
(45) Date of Patent: Mar. 15, 2005

(54) MIRROR DEVICE FOR VEHICLE

(75) Inventor: Kenichi Hayashi, Aichi-ken (JP)

(73) Assignee: Kabushiki Kaisha Tokai-Rika Denki-Seisakusho, Aichi-Ken (JP)

( * ) Notice: Subject to any disclaimer, the term of this patent is extended or adjusted under 35 U.S.C. 154(b) by 90 days.

(21) Appl. No.: 10/282,229

(22) Filed: Oct. 29, 2002

(65) Prior Publication Data
US 2003/0086188 A1 May 8, 2003

(30) Foreign Application Priority Data

Oct. 29, 2001 (JP) ........................................ 2001-330816

(51) Int. Cl.$^7$ .............................. G02B 5/08; G02B 7/18
(52) U.S. Cl. ......................... 359/841; 359/877; 248/476
(58) Field of Search ................................ 359/841, 872, 359/877; 248/476, 479

(56) References Cited

U.S. PATENT DOCUMENTS 5,781,354 A * 7/1998 Sakata ......................... 359/841
6,022,113 A 2/2000 Stolpe et al.

FOREIGN PATENT DOCUMENTS

| EP | 0 169 245 A1 | 1/1986 |
|----|--------------|--------|
| EP | 1 084 906 A2 | 3/2001 |
| GB | 2 237 252 A  | 5/1991 |
| GB | 2 293 152 A  | 3/1996 |
| GB | 2 361 902 A  | 7/2000 |

* cited by examiner

Primary Examiner—Mark A. Robinson
(74) Attorney, Agent, or Firm—Nixon Peabody LLP

(57) ABSTRACT

In a door mirror device for a vehicle, when a twin gear is rotated by driving of a motor, the twin gear moves around a periphery of an output gear. A case member and a motor base member are thereby pivoted around a supporting shaft, and a mirror connected to the case member is retracted or extended. Here, an engagement claw provided at the motor base member engages with an engagement hole provided in the case member. Swaying of the motor base member with respect to the case member can thereby be prevented. Thus, tilting of the twin gear at the time of extending or retracting the mirror can be prevented. It is thereby possible to make meshing of the twin gear and the output gear stable, and to make the operations of retracting and extending the mirror stable.

19 Claims, 4 Drawing Sheets

MIRROR DEVICE FOR VEHICLE

BACKGROUND OF THE INVENTION

1. Field of the Invention

The present invention relates to a mirror device for a vehicle which is provided at a vehicle.

2. Description of the Related Art

A door mirror device for a vehicle is provided with, for example, a retracting mechanism. The retracting mechanism has a stand. The stand is fixed, via a stay, to a door of the vehicle. A supporting shaft is provided integrally with the stand so as to stand upright.

The retracting mechanism has a case member. The case member is formed in the shape of a box whose top surface is open. The case member is supported so as to be freely rotatable around the supporting shaft in a state in which the supporting shaft is inserted in the case member. The case member is connected to a mirror for viewing the region substantially at the rear of the vehicle. The case member thereby always pivots integrally with the mirror.

A motor base member is press-fit into the opening at the top surface of the case member, so as to be assembled together with the case member. The motor base member pivots together with the case member. A motor is set at the motor base member.

A twin gear spans between the bottom wall of the case member and the motor base member, so as to rotate freely. The twin gear is a first gear and a second gear which always rotate integrally. The first gear of the twin gear meshes intermittently with the driving shaft of a motor. The twin gear is thereby rotated by the driving of the motor.

Within the case member, the supporting shaft is inserted through an output gear in a state in which rotation of the output gear is impeded. The output gear meshes with the second gear of the twin gear. In this way, when the twin gear rotates, the twin gear moves around the periphery of the output gear. Thus, the case member and the motor base member pivot around the supporting shaft, and the mirror is retracted or extended.

However, in this door mirror device for a vehicle, the motor base member is assembled in merely by being press-fit into the opening at the top surface of the case member. Thus, if impacts are repeatedly applied from the exterior to the retracting mechanism (in particular, the opening at the top surface of the case member or the motor base member) or if the operations of retracting the mirror and extending the mirror are repeated, the force of anchoring the motor base member by the case member is reduced.

In this way, when the mirror is retracted or extended, the motor base member sways (rocks) with respect to the case member, and the twin gear tilts. Thus, the meshing of the output gear and the second gear of the twin gear may become unstable, and the operation of retracting the mirror or the operation of extending the mirror may become unstable. In particular, at the time of completion of retracting of the mirror or at the time of completion of extending of the mirror, it is easy for the motor base member to sway, with respect to the case member, mainly in a direction perpendicular to a central perpendicular line (a line perpendicular to the central axis of the supporting shaft and to the central axis of the twin gear). Thus, it is easy for the meshing of the output gear and the second gear of the twin gear to become unstable at the time when retracting of the mirror starts or extending of the mirror starts.

SUMMARY OF THE INVENTION

In view of the aforementioned, an object of the present invention is to provide a mirror device for a vehicle which can stabilize the operations of retracting and extending a mirror, and a mirror device for a vehicle which can prevent a base member from swaying with respect to a pivoting member.

A mirror device for a vehicle of a first aspect of the present invention comprises: a pivoting member which is supported so as to be freely pivotable at a supporting shaft fixed to a vehicle body, and which is connected to a mirror for viewing a region substantially to a rear of the vehicle, and which always pivots integrally with the mirror; a base member at which a motor is set, and which is provided at the pivoting member and pivots together with the pivoting member; a rotating gear spanning between the pivoting member and the base member so as to be freely rotatable, and being rotated by driving of the motor; an output gear provided at the supporting shaft in a state in which rotation of the output gear is impeded, and meshing with the rotating gear, such that due to the rotating gear moving around a periphery of the output gear due to the rotating gear rotating, the pivoting member and the base member are pivoted around the supporting shaft and the mirror is one of retracted and extended; an engagement claw provided so as to project at one of the pivoting member and the base member; and an engagement hole provided at another of the pivoting member and the base member so as to correspond to the engagement claw, and the engagement claw engages with the engagement hole.

In the mirror device for a vehicle of the first aspect, the pivoting member is supported so as to be freely pivotable at the supporting shaft which is fixed to a vehicle body. The base member is provided at the pivoting member. Due to the driving of the motor which is set at the base member, the rotating gear, which spans between the pivoting member and the base member, is rotated. When the rotating gear is rotated, the rotating gear moves around the periphery of the output gear which is provided at the supporting shaft in a state in which rotation of the output gear is impeded. In this way, the pivoting member and the base member are pivoted around the supporting shaft, and the mirror, which is connected to the pivoting member, is retracted or extended.

Here, the engagement claw, which is provided so as to project at one of the pivoting member and the base member, engages with the engagement hole which is provided at the other of the pivoting member and the base member. In this way, swaying of the base member with respect to the pivoting member can be prevented. Thus, even if impacts from the exterior are repeatedly applied to the pivoting member or the base member, or if the operation of retracting the mirror and the operation of extending the mirror are repeated, the rotating gear can be prevented from tilting at the time when the mirror is retracted or extended. In this way, the meshing of the rotating gear and the output gear can be made stable, and the operations of retracting the mirror and extending the mirror can be made stable.

A mirror device for a vehicle of a second aspect of the present invention is characterized in that, in the mirror device for a vehicle of the first aspect, the engagement claw projects in a direction perpendicular to a central perpendicular line which is perpendicular to a central axis of the supporting shaft and to a central axis of the rotating gear.

In the mirror device for a vehicle of the second aspect, the engagement claw projects in a direction perpendicular to the central perpendicular line (i.e., the line which is perpendicular to the central axis of the supporting shaft and to the central axis of the rotating gear). Thus, due to the engagement claw engaging with the engagement hole, the base member can be satisfactorily prevented from swaying, with respect to the pivoting member, in a direction perpendicular to the central perpendicular line. In this way, the operation of retracting the mirror and the operation of extending the mirror can be made to be quite stable.

A mirror device for a vehicle of a third aspect of the present invention is characterized in that, in the mirror device for a vehicle of the first aspect, the engagement claw is provided at a position which is offset, in a direction of the central perpendicular line, from the central axis of the rotating gear.

In the mirror device for a vehicle of the third aspect, the engagement claw is provided at a position which is offset, in the direction of the central perpendicular line, from the central axis of the rotating gear. Thus, due to the engagement claw engaging with the engagement hole, the base member can be satisfactorily prevented from swaying, with respect to the pivoting member, in the direction of the central perpendicular line. In this way, the operation of retracting the mirror and the operation of extending the mirror can be made to be quite stable.

A mirror device for a vehicle of a fourth aspect of the present invention is characterized in that, in the mirror device for a vehicle of the first aspect, the base member makes area contact with the pivoting member.

In the mirror device for a vehicle of the fourth aspect, because the base member makes area contact with the pivoting member, the base member can be satisfactorily prevented from swaying with respect to the pivoting member. In this way, the operations of retracting and extending the mirror can be well stabilized.

A mirror device for a vehicle of a fifth aspect of the present invention is characterized in that the mirror device for a vehicle of the first aspect further comprises an inclined surface provided at at least one of the engagement claw and the other of the pivoting member and the base member, and guiding insertion of the engagement claw toward the other of the pivoting member and the base member.

In the mirror device for a vehicle of the fifth aspect, an inclined surface, which is provided at at least one of the engagement claw and the other of the pivoting member and the base member, guides the insertion of the engagement claw toward the other of the pivoting member and the base member. Thus, the engagement claw can be easily inserted into the other of the pivoting member and the base member, and the engagement claw can be easily engaged with the engagement hole. Moreover, damage to the engagement claw and to the other of the pivoting member and the base member can be suppressed.

A mirror device for a vehicle of a sixth aspect of the present invention comprises: a pivoting member which is supported at a supporting shaft fixed to a vehicle body and is connected to a mirror for viewing a region substantially toward a rear of the vehicle; a base member provided at the pivoting member such that due to the base member pivoting together with the pivoting member around the supporting shaft, the mirror is retracted or extended; and a fixing component fixes the base member to the pivoting member.

DESCRIPTION OF THE PREFERRED EMBODIMENT

Figure 1:
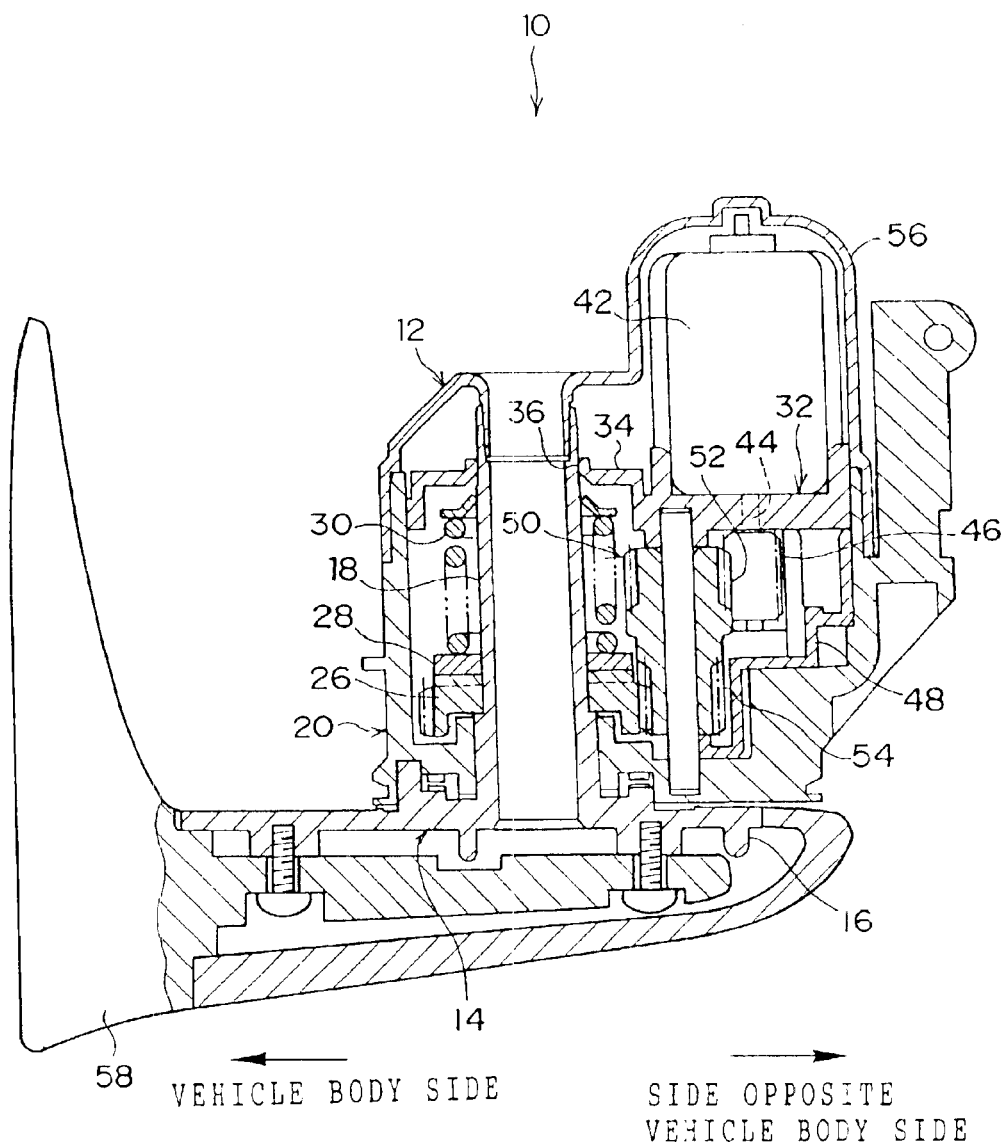
FIG. 1 is a longitudinal sectional view showing a retracting mechanism of a door mirror device for a vehicle relating to an embodiment of the present invention.

FIG. 1 illustrates, in sectional view, main portions of a door mirror device 10 for a vehicle relating to an embodiment which is structured by applying the mirror device for a vehicle of the present invention.

The door mirror device 10 for a vehicle relating to the present embodiment has a retracting mechanism 12. The retracting mechanism 12 has a stand 14. A plate-shaped base plate 16 is provided at the stand 14. At the base plate 16, the stand 14 is fixed to a vehicle door (not shown) via a stay 58. A substantially hollow cylindrical supporting shaft 18 stands upright, integrally with the base plate 16. The supporting shaft 18 is thereby fixed to the vehicle body.

The retracting mechanism 12 has a case member 20 serving as a pivoting member. The case member 20 is formed in the shape of a box whose top surface is open. The supporting shaft 18 passes through the bottom wall of the case member 20 at a region of the case member 20 toward the vehicle body. The case member 20 is supported so as to be freely rotatable at the supporting shaft 18 in the state in which the supporting shaft 18 is inserted through the interior of the case member 20. The case member 20 is connected to a mirror (not illustrated) for viewing the region substantially toward the rear of the vehicle, via a plate-shaped frame (not illustrated) and a mirror surface adjusting mechanism (not illustrated). The case member 20 thereby always pivots integrally with the mirror.

Figure 2:
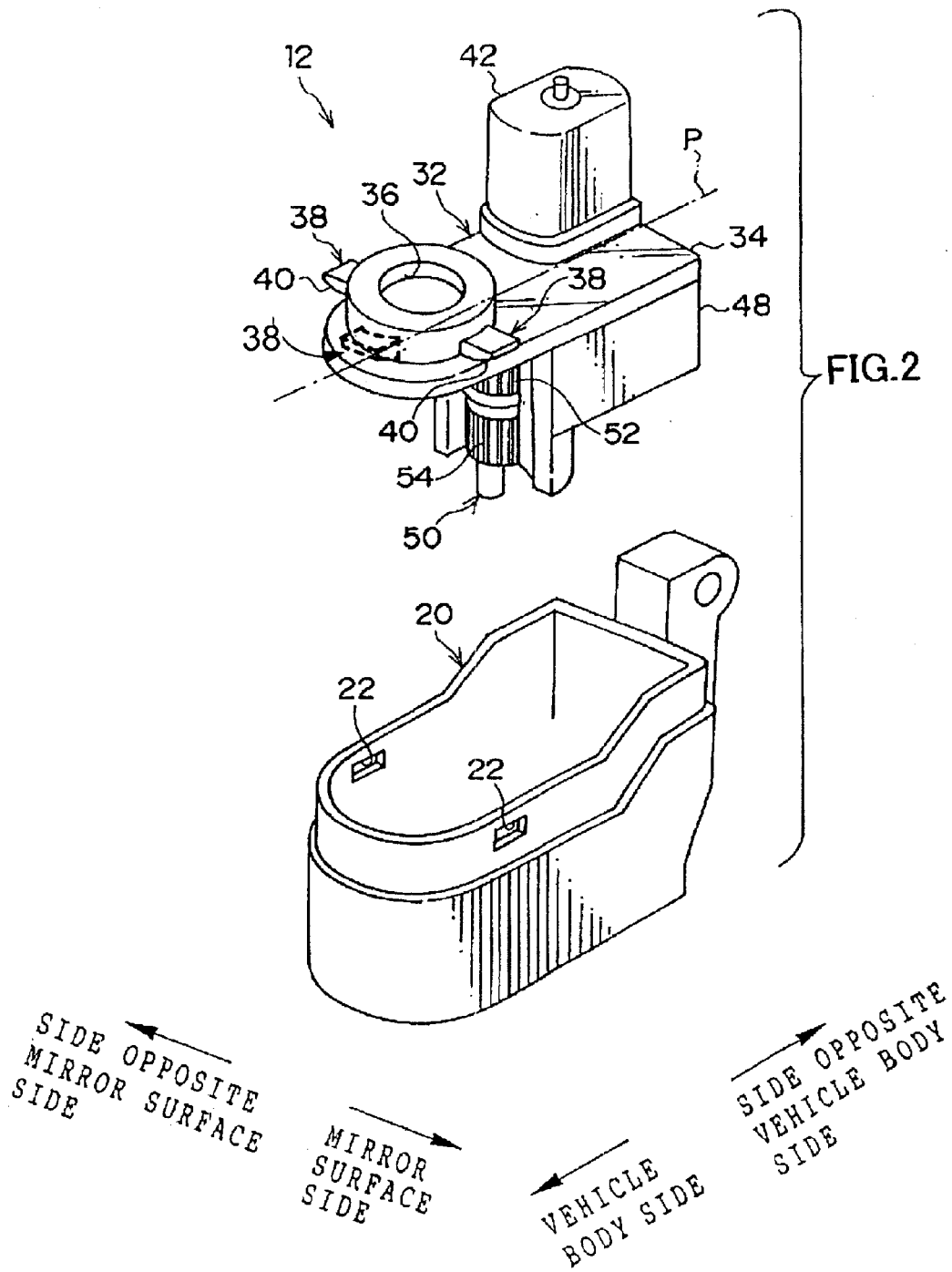
FIG. 2 is an exploded perspective view showing a case member and a motor base member of the door mirror device for a vehicle relating to the embodiment of the present invention.
Figure 3:
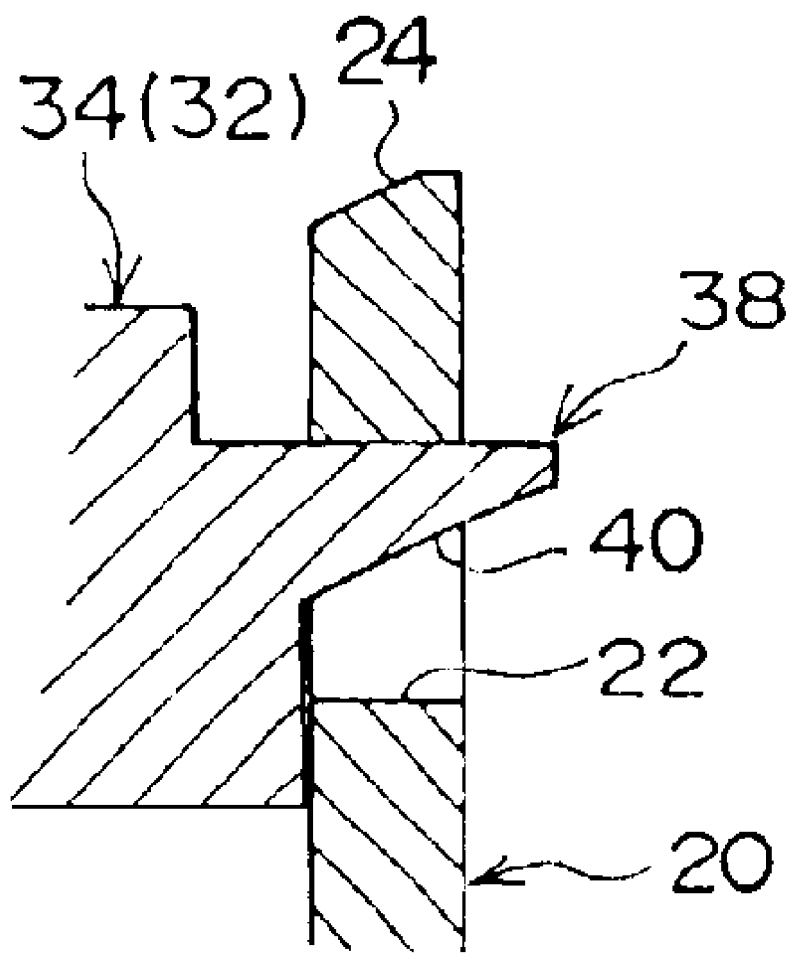
FIG. 3 is a cross-sectional view showing an engaged state of an engagement claw and an engagement hole in the door mirror device for a vehicle relating to the embodiment of the present invention.

As shown in FIG. 2, rectangular engagement holes 22, which form a fixing component, are formed in the side wall of the case member 20 at the mirror surface side and in the side wall of the case member 20 at the side opposite the mirror surface side, in the top end portions of the regions thereof toward the vehicle body. The pair of engagement holes 22 oppose one another. Further, as shown in FIG. 3, an inclined surface 24 is formed at the top edge of the side wall of the case member 20. The inclined surface 24 slants downwardly toward the inner side of the case member 20.

The supporting shaft 18 within the case member 20 is inserted through a substantially disc-shaped output gear 26 such that the output gear 26 can rotate freely. The supporting shaft 18 is inserted through a substantially disc-shaped clutch plate 28 such that the clutch plate 28 cannot rotate and such that the clutch plate 28 is disposed above the output gear 26. The clutch plate 28 is urged downward by a compression coil spring 30 through which the supporting shaft 18 is inserted, such that the clutch plate 28 frictionally engages with the output gear 26. In this way, rotation of the output gear 26 with respect to the supporting shaft 18 is impeded.

A motor base member 32 serving as a base member is disposed within the case member 20. A substantially plate-shaped base upper portion 34 is provided at the upper portion of the motor base member 32. A circular insert-through hole 36 is formed in the region of the base upper portion 34 toward the vehicle body. The supporting shaft 18 is inserted through this insert-through hole 36. The base upper portion 34 is press-fit into the top surface opening of the case member 20. In this way, the motor base member 32 and the case member 20 pivot together.

As shown in FIG. 2, engagement claws 38, which are substantially formed in the shape of rectangular columns and which form the fixing component, are provided at the mirror surface side end portion of the base upper portion 34 and at the end portion of the base upper portion 34 opposite the mirror surface side end portion, so as to correspond to the respective engagement holes 22. The pair of engagement claws 38 oppose one another. Each engagement claw 38 projects from the base upper portion 34 in a direction perpendicular to a central perpendicular line P. (The central perpendicular line P is a line (the one-dot chain line in FIG. 2) perpendicular to the central axis of the supporting shaft 18 and to the central axis of a twin gear 50 which will be described later. In the present embodiment, the central perpendicular line P is the transverse direction central line of the case member 20.) Further, each engagement claw 38 is provided at a position which substantially opposes the supporting shaft 18. Thus, each engagement claw 38 is disposed at a position which is offset, in the direction of the central perpendicular line P, from the central axis of the twin gear 50 toward the vehicle body.

As shown in FIG. 3, the engagement claws 38 are inserted into and engage with (snap-fit with) the respective engagement holes 22. The top surfaces of the engagement claws 38 abut the top surfaces of the engagement holes 22. Inclined surfaces 40 are formed at the bottom surfaces of the engagement claws 38. The inclined surfaces 40 are inclined downwardly toward the inner side of the base upper portion 34.

A motor 42 is set at the base upper portion 34 at the top surface thereof at the region at the side opposite the vehicle body side. A drive shaft 44 of the motor 42 is inserted through the base upper portion 34, and extends beneath the base upper portion 34. A drive gear 46 is fixed to the drive shaft 44.

A box-shaped base lower portion 48 is fixed to the base upper portion 34 at the region thereof at the side opposite the vehicle body side. The outer side surface of the base lower portion 48 at the side opposite the vehicle body side, the outer side surface of the base lower portion 48 at the mirror surface side, and the outer side surface of the base lower portion 48 at the side opposite the mirror surface side respectively make area contact with the inner side surface of the case member 20 at the side opposite the vehicle body side, the inner side surface of the case member 20 at the mirror surface side, and the inner side surface of the case member 20 at the side opposite the mirror surface side. A gear mechanism (not shown) is provided within the base lower portion 48. The input portion of the gear mechanism meshes with the drive gear 46 of the motor 42.

The twin gear 50, which serves as a rotating gear, spans between the bottom wall of the case member 20 and the base upper portion 34 so as to rotate freely. The lower end and the upper end of the twin gear 50 are respectively press-fit into the substantially central region of the bottom wall of the case member 20 and the substantially central region of the base upper portion 34. A first gear 52 is provided at the upper portion of the twin gear 50. The first gear 52 meshes with the output portion of the gear mechanism. Thus, when the motor 42 is driven, the twin gear 50 rotates via the drive gear 46 and the gear mechanism.

A second gear 54 (a spur gear) is provided at the lower portion of the twin gear 50. The second gear 54 always rotates integrally with the first gear 52, and meshes with the output gear 26. Thus, when the twin gear 50 is rotated, the twin gear 50 (the second gear 54) moves around the periphery of the output gear 26. In this way, the case member 20 and the motor base member 32 pivot around the supporting shaft 18, and the mirror is retracted or extended.

Note that a cap-shaped cover 56 is fit together with the upper portion of the case member 20. The cover 56 covers the case member 20 and the motor base member 32 (including the motor 42) from above.

Here, the retracting mechanism 12 of the door mirror device 10 for a vehicle is manufactured by at least the following steps: a step of providing the engagement claws 38 to project at the base upper portion 34 of the motor base member 32; a step of providing the engagement holes 22 in the case member 20; and a step of assembling the case member 20 and the motor base member 32 by inserting (press-fitting) the base upper portion 34 into the top surface opening of the case member 20 such that the engagement claws 38 engage with the engagement holes 22.

Next, operation of the present embodiment will be described.

In the door mirror device 10 for a vehicle which is structured as described above, the case member 20 is supported so as to be freely pivotable at the supporting shaft 18 of the stand 14 which is fixed to a vehicle body. The motor base member 32 is provided at the case member 20. Due to the driving of the motor 42 which is set at the motor base member 32, the twin gear 50, which spans between the case member 20 and the motor base member 32, is rotated. When the twin gear 50 rotates, the twin gear 50 moves around the periphery of the output gear 26 which is provided at the supporting shaft 18 in a state in which rotation thereof is hindered. In this way, the case member 20 and the motor base member 32 pivot around the supporting shaft 18, and the mirror connected to the case member 20 is retracted or extended.

Figure 4:
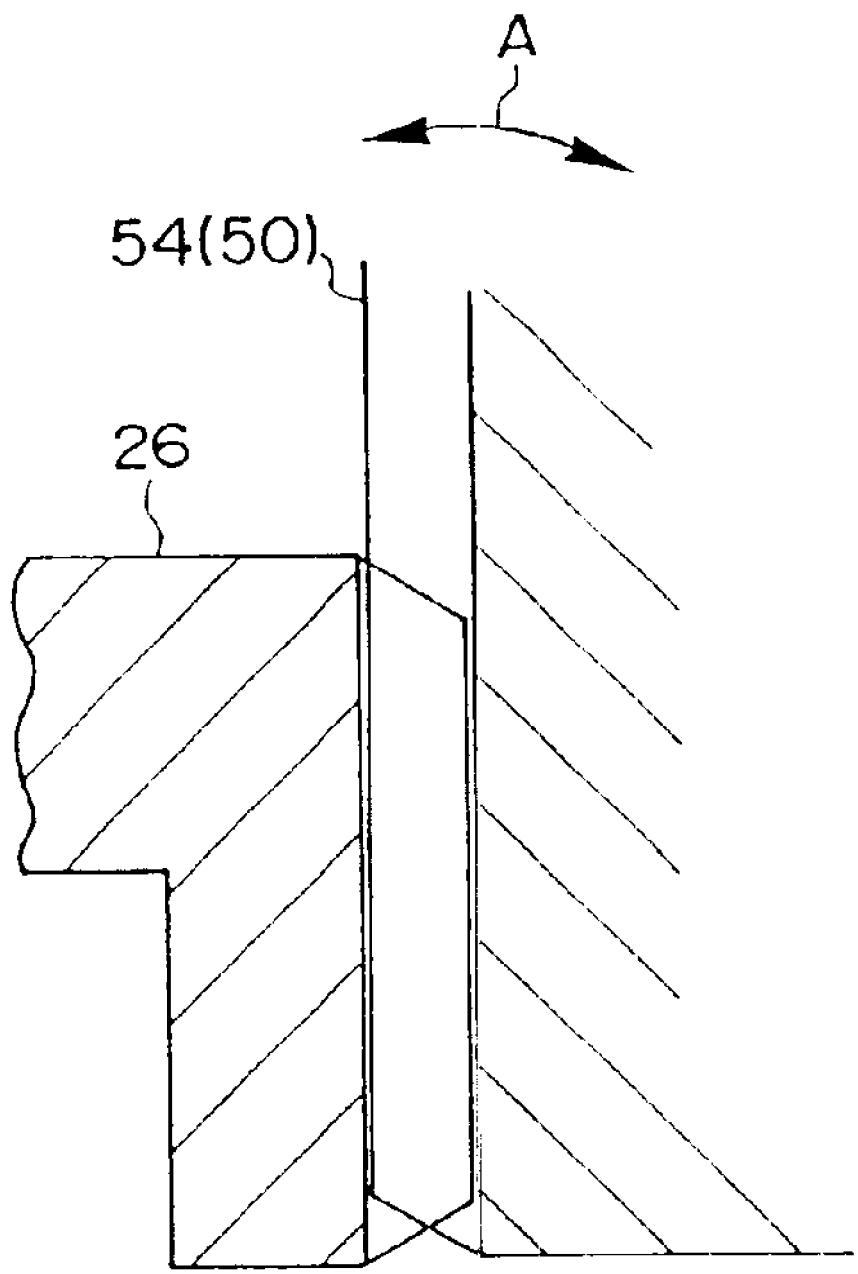
FIG. 4 is a cross-sectional view showing a meshed state of an output gear and a second gear of a twin gear in the door mirror device for a vehicle relating to the embodiment of the present invention.

Here, the engagement claws 38, which are provided so as to project at the motor base member 32, engage with the engagement holes 22 provided in the case member 20. In this way, the motor base member 32 can be prevented from swaying with respect to the case member 20. Therefore, even if impacts from the exterior are repeatedly applied to the case member 20 (the region of the top surface opening in particular) or the motor base member 32 (the base upper portion 34 in particular) or if the operations of retracting and extending the mirror are repeated, it is possible to prevent the twin gear 50 from tilting in the directions of arrow A in FIG. 4 at the time when the mirror is retracted or extended. In this way, the meshing of the twin gear 50 and the output gear 26 can be stabilized, and the operations of retracting and extending the mirror can be stabilized.

Moreover, the base upper portion 34 of the motor base member 32 is press-fit into the top surface opening of the case member 20. In this way, the motor base member 32 can be prevented even more from swaying with respect to the case member 20. Thus, the operations of retracting and extending the mirror can be made even more stable.

The pair of engagement claws 38 project toward both sides in a direction perpendicular to the central perpendicular line P, and the engagement claws 38 engage with the respective engagement holes 22 in a state in which the top surfaces of the engagement claws 38 abut the top surfaces of the engagement holes 22. Thus, it is possible to satisfactorily prevent the motor base member 32 from swaying, with respect to the case member 20, toward the both sides in the direction perpendicular to the central perpendicular line P. In this way, the operations of retracting and extending the mirror can be made to be quite stable.

Further, the pair of engagement claws 38 are provided at positions which are offset, in the direction of the central perpendicular line P, toward the vehicle body side from the central axis of the twin gear 50, and the engagement claws 38 engage with the engagement holes 22 in the state in which the top surfaces of the engagement claws 38 abut the top surfaces of the engagement holes 22. Therefore, the motor base member 32 can be satisfactorily prevented from swaying in the direction of the central perpendicular line P with respect to the case member 20 (i.e., the region, at the vehicle body side, of the motor base member 32 can be satisfactorily prevented from swaying upward) In this way, the operations of retracting and extending the mirror can be made to be quite stable.

Moreover, the base lower portion 48 of the motor base member 32 makes area contact with the inner side surface of the case member 20 at the side opposite the vehicle body side. Thus, the motor base member 32 can satisfactorily be prevented from swaying with respect to the case member 20 (i.e., the region, of the motor base member 32, at the side opposite the vehicle body side can be satisfactorily prevented from swaying upward). In this way, the operations of retracting the mirror and extending the mirror can thereby be made to be well stable.

Here, the inclined surface 24, which is formed at top edge of the side wall of the case member 20, and the inclined surfaces 40, which are formed at the bottom surfaces of the engagement claws 38 of the motor base member 32, guide the insertion of the engagement claws 38 into the opening at the top surface of the case member 20. Thus, the engagement claws 38 can be easily inserted into the top surface opening of the case member 20, and the engagement claws 38 can easily engage with the engagement holes 22. Moreover, the amount of deformation of the top surface opening of the case member 20 and the engagement claws 38 at the time of engaging the engagement claws 38 with the engagement holes 22 can be kept small, and damage to the case member 20 and the engagement claws 38 can be suppressed.

Note that, in the present embodiment, the mirror device for a vehicle of the present invention is applied to the door mirror device 10 for a vehicle. However, the mirror device for a vehicle of the present invention can be applied to fender mirror devices for vehicles or to mirror devices other than those of vehicles.

In the present embodiment, the engagement claws 38 are provided at the motor base member 32, and the engagement holes 22 are provided at the case member 20. However, a structure may be used in which the engagement claw is provided at the case member (the pivoting member) and the engagement hole is provided at the motor base member (the base member).

Moreover, in the present embodiment, the engagement claws 38 engage with the engagement holes 22 in a state in which the top surfaces of the engagement claws 38 abut the top surfaces of the engagement holes 22. However, the engagement claw may engage with the engagement hole in a state in which the bottom surface of the engagement claw abuts the bottom surface of the engagement hole, or in a state in which the top surface and the bottom surface of the engagement claw abut the top surface and the bottom surface of the engagement hole. In addition, it is possible to provide one engagement claw and one engagement hole in the case of, for example, a structure in which the engagement claw engages with the engagement hole in a state in which the top surface and the bottom surface of the engagement claw abut the top surface and the bottom surface of the engagement hole.

In the present embodiment, the engagement claws 38 project in a direction perpendicular to the central perpendicular line P. However, the engagement claw may project in a direction parallel to the central perpendicular line. In this case, the engagement claw may be provided at a position which is offset from the central perpendicular line.

Moreover, in the present embodiment, the engagement claws 38 are provided at positions which are offset, in the direction of the central perpendicular line P, toward the vehicle body side from the central axis of the twin gear 50. However, the engagement claw may be provided at a position which is offset, in the direction of the central perpendicular line, toward the side opposite the vehicle body side from the central axis of the twin gear (the rotating gear). Moreover, in this case and in other cases, the motor base member (the base member) may be structured so as to make area contact with the inner side surface, at the vehicle body side, of the case member (the pivoting member).

Moreover, in the present embodiment, the inclined surface 24 is provided at the case member 20 at which the engagement holes 22 are provided, and the inclined surfaces 40 are provided at the engagement claws 38 of the motor base member 32. However, it is possible to provide an inclined surface only at either the engagement claw, or the motor base member (the base member) or the case member (the pivoting member) at which the engagement hole provided.

What is claimed is:

1. A mirror device for a vehicle, comprising:

a pivoting member which is supported so as to be freely pivotable at a supporting shaft fixed to a vehicle body, and which is connected to a mirror for viewing a region substantially to a rear of the vehicle, and which always pivots integrally with the mirror;

a base member at which a motor is set, and which is provided at the pivoting member and pivots together with the pivoting member;

a rotating gear spanning between the pivoting member and the base member so as to be freely rotatable, and being rotated by driving of the motor;

an output gear provided at the supporting shaft in a state in which rotation of the output gear is impeded, and meshing with the rotating gear, such that due to the rotating gear moving around a periphery of the output gear due to the rotating gear rotating, the pivoting member and the base member are pivoted around the supporting shaft and the mirror is one of retracted and extended;

an engagement claw provided so as to project at one of the pivoting member and the base member; and an engagement hole provided at another of the pivoting member and the base member so as to correspond to the engagement claw, and the engagement claw engages with the engagement hole.

2. The mirror device for a vehicle of claim 1, wherein the engagement claw projects in a direction perpendicular to a central perpendicular line which is perpendicular to a central axis of the supporting shaft and to a central axis of the rotating gear.

3. The mirror device for a vehicle of claim 1, wherein the engagement claw is provided at a position which is offset, from the central axis of the rotating gear in a direction of a central perpendicular line which is perpendicular to a central axis of the supporting shaft and to a central axis of the rotating gear.

4. The mirror device for a vehicle of claim 1, wherein the base member makes area contact with the pivoting member.

5. The mirror device for a vehicle of claim 1, further comprising an inclined surface provided at at least one of the engagement claw and the other of the pivoting member and the base member, and guiding insertion of the engagement claw toward the other of the pivoting member and the base member.

6. The mirror device for a vehicle of claim 1, wherein one of the pivoting member and the base member is press-fit into another of the pivoting member and the base member.

7. The mirror device for a vehicle of claim 1, wherein the engagement claw abuts a periphery of the engagement hole.

8. The mirror device for a vehicle of claim 1, wherein the engagement claw projects in a direction parallel to a central perpendicular line which is perpendicular to a central axis of the supporting shaft and to a central axis of the rotating gear.

9. The mirror device for a vehicle of claim 1, wherein the engagement claw is provided at a position offset from a central perpendicular line which is perpendicular to a central axis of the supporting shaft and to a central axis of the rotating gear.

10. A mirror device for a vehicle, comprising:
   a pivoting member which is supported at a supporting shaft fixed to a vehicle body and is connected to a mirror for viewing a region substantially toward a rear of the vehicle;
   a base member provided at the pivoting member such that due to the base member pivoting together with the pivoting member around the supporting shaft, the mirror is retracted or extended;
   a rotating gear spanning between the pivoting member and the base member;
   an engagement claw provided so as to project at one of the pivoting member and the base member; and
   an engagement hole provided at another of the pivoting member and the base member in correspondence with the engagement claw, such that the engagement claw engages with the engagement hole.

11. The mirror device for a vehicle of claim 10, further comprising:
   an output gear provided at the supporting shaft, and meshing with the rotating gear, such that, due to the rotating gear being rotated and moving around a periphery of the output gear, the pivoting member and the base member are pivoted around the supporting shaft.

12. The mirror device for a vehicle of claim 11, further comprising a fixing component is provided at a position which is offset from a central perpendicular line which is perpendicular to a central axis of the supporting shaft and to a central axis of the rotating gear.

13. The mirror device for a vehicle of claim 12, wherein the fixing component is provided at a position which is offset from the central axis of the rotating gear in a direction of a central perpendicular line which is perpendicular to a central axis of the supporting shaft and to a central axis of the rotating gear.

14. The mirror device for a vehicle of claim 10, wherein the base member makes area contact with the pivoting member.

15. The mirror device for a vehicle of claim 10, wherein one of the pivoting member and the base member is press-fit into another of the pivoting member and the base member.

16. The mirror device for a vehicle of claim 10, wherein the engagement claw projects in one of a direction perpendicular and a direction parallel to a central perpendicular line which is perpendicular to a central axis of the supporting shaft and to a central axis of the rotating gear.

17. The mirror device for a vehicle of claim 10, wherein the engagement claw abuts a periphery of the engagement hole.

18. The mirror device for a vehicle of claim 10, further comprising an inclined surface provided at at least one of the engagement claw and the other of the pivoting member and the base member, and guiding insertion of the engagement claw toward the other of the pivoting member and the base member.

19. A mirror device for a vehicle, comprising:
   a pivoting member which is supported so as to be freely pivotable at a supporting shaft fixed to a vehicle body, and which is connected to a minor for viewing a region substantially to a rear of the vehicle, and which always pivots integrally with the mirror;
   a base member at which a motor is set, and which is provided at the pivoting member, and pivots together with the pivoting member and includes a collar having a through-hole through which the supporting shaft extends;
   a rotating gear a longitudinal axis of which extends spanning between the pivoting member and the base member so as to be freely rotatable, and being rotated by driving of the motor;
   an output gear provided at the supporting shaft in a state in which rotation of the output gear is impeded, and meshing with the rotating gear, such that due to the rotating gear moving around a periphery of the output gear due to the rotating gear rotating, the pivoting member and the base member are pivoted around the supporting shaft and the mirror is one of retracted and extended;
   at least one an engagement claw positioned adjacent a periphery of the collar and provided so as to project at one of the pivoting member and the base member; and
   at least one an engagement hole positioned adjacent a periphery of the collar and provided at another of the pivoting member and the base member so as to correspond to the engagement claw, and the engagement claw engages with the engagement hole.

* * * * *